UNITED STATES PATENT OFFICE.

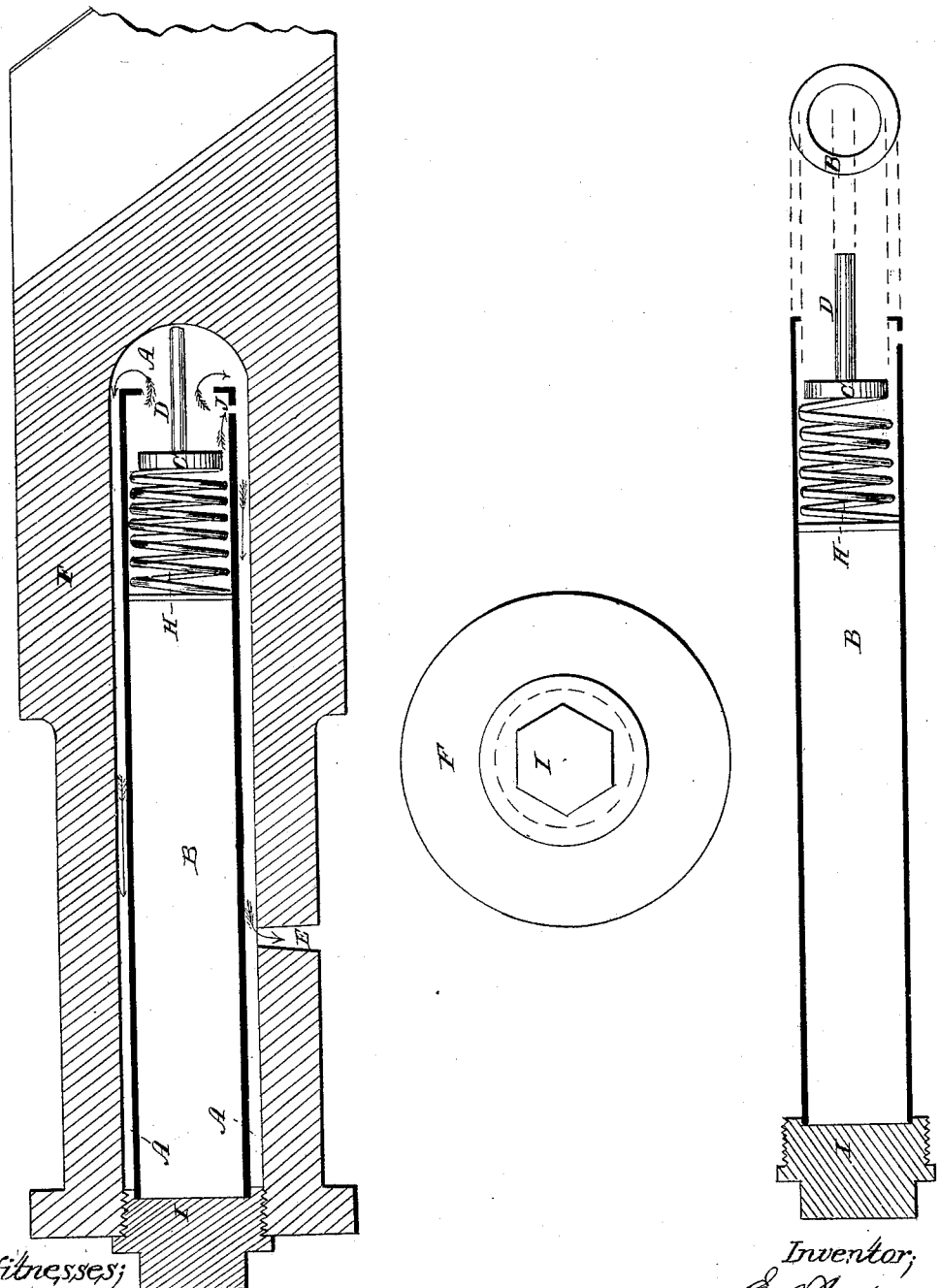

EDWARD ANDREWS AND JOHN H. CARR, OF PALO ALTO, PENNSYLVANIA.

IMPROVEMENT IN LUBRICATING JOURNALS.

Specification forming part of Letters Patent No. 27,416, dated March 13, 1860.

*To all whom it may concern:*

Be it known that we, EDWARD ANDREWS and JOHN H. CARR, of Palo Alto, in the county of Schuylkill and State of Pennsylvania, have invented a new and Improved Mode of Lubricating the Bearings or Journals of Shafts or Axles; and we do hereby declare that the following is a full and exact description thereof, reference being had to the accompanying drawing and letters of reference marked thereon.

The nature of our invention is to form an air-tight chamber to contain the lubricating material in the shaft or journal, thereby excluding all dust and air and preventing and preserving the lubricating material from decomposition, the lubricating material being supplied to the bearings of the journal or shafts through a hole communicating from the air-tight chamber to the outer surface or circumference of journals or shafts.

To enable others skilled in the art to make and use our invention, we will proceed to describe its construction and operation.

We construct our axle or journal of any of the known forms, leaving an aperture A in the center of the axle or journal, which aperture A may be made during the process of manufacture or afterward by drilling one or more holes in the end of axle F or journals to form a chamber for containing the lubricating material, the axle also having one or more holes communicating from oil-chamber to outer circumference of journal or bearing. In order to accomplish the insertion of the lubricating material in axles or journals that are horizontal or perpendicular or in unhandy positions not of frequent or easy of access, we construct a tube B, charged with the lubricating material, to slip in chamber or aperture A loose enough to allow the free passage of the lubricating material around the tube B, the said tube B being screwed to the axle or journal by a screw I or to fit air-tight at one end of the aperture for the purpose of containing the lubricating material in the tube B before insertion. We construct the tube with a valve C in the opposite end of tube B, the said valve C being smaller in diameter than the inside of the tube B to allow free passage of the lubricating material when open, the valve C having a spring H inside the tube B pressing the valve C against the end of tube B, the valve C having a stem D or piston attached to it projecting through one end of tube B for the purpose of opening the valve C and allowing the tube to be charged with the lubricating material, the tube B also having a small hole J in the outer circumference of tube near the valve C or end of tube B.

Operation: The tube B is charged with the lubricating material by depressing piston or stem D, and thereby filling the tube. On releasing the stem D the valve C closes by pressure of spring inside of tube B and retains the lubricating material. The tube now is inserted into axle or journal and the stem D, coming in contact with end of chamber A, opens the valve C and allows the lubricating material to escape into the aperture A and then supplying it to the outer circumference of journal through small hole E.

What we claim as our invention, and desire to secure by Letters Patent, is—

The combination and arrangement of the air-tight chamber A, tube B, valve C, spring H, and piston D with small hole E, constructed and operated substantially as described.

E. ANDREWS.
      JOHN H. CARR.

Witnesses:
 WATERS S. CHILLSON,
 J. B. SESINGER.